(12) United States Patent
Guo

(10) Patent No.: US 8,141,429 B2
(45) Date of Patent: Mar. 27, 2012

(54) HIGH TEMPERATURE CAPACITIVE STATIC/DYNAMIC PRESSURE SENSORS AND METHODS OF MAKING THE SAME

(75) Inventor: Shuwen Guo, Burnsville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 105 days.

(21) Appl. No.: 12/804,874

(22) Filed: Jul. 30, 2010

(65) Prior Publication Data
US 2012/0024073 A1 Feb. 2, 2012

(51) Int. Cl.
*G01L 9/12* (2006.01)

(52) U.S. Cl. ............ 73/718; 73/715; 73/717; 361/283.4

(58) Field of Classification Search .................. None
See application file for complete search history.

(56) References Cited

U.S. PATENT DOCUMENTS

| | | | |
|---|---|---|---|
| 4,730,496 A * | 3/1988 | Knecht et al. .................... | 73/724 |
| 5,101,165 A | 3/1992 | Rickards | |
| 5,186,055 A * | 2/1993 | Kovacich et al. ............... | 73/727 |
| 5,349,492 A | 9/1994 | Kimura et al. | |
| 5,539,292 A | 7/1996 | Vranish | |
| 5,546,005 A | 8/1996 | Rauchwerger | |
| 5,692,690 A | 12/1997 | Gulledge et al. | |
| 5,892,365 A | 4/1999 | Bailleul et al. | |
| 5,955,771 A | 9/1999 | Kurtz et al. | |
| 5,992,240 A | 11/1999 | Tsuruoka et al. | |
| 6,058,782 A | 5/2000 | Kurtz et al. | |
| 6,148,674 A | 11/2000 | Park et al. | |
| 6,365,055 B1 | 4/2002 | Weber et al. | |
| 6,425,291 B1 * | 7/2002 | Flogel .......................... | 73/729.1 |
| 6,450,039 B1 | 9/2002 | Masuda | |
| 6,508,130 B2 * | 1/2003 | Werner et al. ................... | 73/756 |
| 6,564,643 B1 | 5/2003 | Horie et al. | |
| 6,989,679 B2 | 1/2006 | Lieder et al. | |
| 7,152,478 B2 * | 12/2006 | Peterson et al. ................ | 73/715 |
| 7,181,972 B2 * | 2/2007 | Dasgupta et al. ............... | 73/705 |
| 7,258,806 B1 | 8/2007 | Ho | |
| 7,307,325 B2 | 12/2007 | Kurtz et al. | |

(Continued)

OTHER PUBLICATIONS

Wachtman, Jr., J.B. and Maxwell, L.H., "Plastic Deformation of Ceramic-Oxide Single Crystals, II," Journal of The American Ceramic Society, Schenectady, vol. 40, No. 11, pp. 377-385.

(Continued)

*Primary Examiner* — Lisa Caputo
*Assistant Examiner* — Jermaine Jenkins
(74) *Attorney, Agent, or Firm* — Scott D. Wofsy; David J. Silva; Edwards Wildman Palmer LLP

(57) ABSTRACT

Disclosed are capacitive pressure probes or sensors for high temperature applications. The capacitive pressure sensors of the present invention include, inter alia, a sapphire diaphragm which is disposed within an interior sensing chamber of the probe housing and has a first electrode formed on a central portion thereof. The central portion of the diaphragm and the first electrode are adapted and configured to deflect in response to pressure variations encountered within an interior sensing chamber and by the pressure sensor. A sapphire substrate which has a second electrode formed thereon is fused to the sapphire diaphragm about its periphery to form a sapphire stack and to define a reference chamber therebetween. Prior to fusing the sapphire diaphragm to the sapphire substrate, all contact surfaces are chemically treated and prepared using plasma activation, so as to create a bonding layer and to reduce the temperature required for the fusion.

29 Claims, 6 Drawing Sheets

U.S. PATENT DOCUMENTS

2009/0158853 A1 6/2009 Berner et al.
2010/0000326 A1 1/2010 Guo

OTHER PUBLICATIONS

Kimura, S.; Ishikura, Y; Kataoka, T.; Soeda, M.; Masuda, T.; Yoshikawa, Y.; and Nagata, M., "Stable and Corrosion-Resistant Sapphire Capacitive Pressure Sensor for High Temperature and Harsh Environments," Transducers '01, Eurosensors XV, The 11th International Conference on Solid State Sensors and Actuators, Munich, Germany, Jun. 10-14, 2001, pp. 518-521.

Soeda, M.; Kataoka, T.; Ishikura, Y.; Kimura, S.; Masuda, T.; Yoshikawa, Y.; and Nagata, M., "Sapphire-based Capacitive Pressure Sensor For High Temperature and Harsh Environment Application," © 2002, pp. 950-953.

Ishihara, T.; Sekine, M.; Ishikura, Y.; Kimura, S.; Harada, H.; Nagata, M. and Masuda T., "Sapphire-Based Capacitance Diaphragm Gauge For High Temperature Applications," Tranducers '05, The 13th International Conference on Solid-State Sensors, Actuators and Microsystems, Seoul Korea, Jun. 5-9, 2005, vol. 1, pp. 503-506.

PIWG website http://www.piwg.org/sensor_hdpressure.html (accessed Jan. 11, 2010).

* cited by examiner

HIGH TEMPERATURE CAPACITIVE STATIC/DYNAMIC PRESSURE SENSORS AND METHODS OF MAKING THE SAME

BACKGROUND OF THE INVENTION

1. Field of the Invention

The subject invention is directed to capacitive pressure sensors, and more particularly, to high temperature capacitive static/dynamic pressure sensors, such as sensors or microphones for detecting acoustic pressure waves in a gas turbine engine, which employs a diaphragm made from a material exhibiting high thermal strength, thermal stability and oxidation resistance at elevated temperatures.

2. Description of Related Art

Capacitive pressure sensors are well known in the art, as disclosed for example in U.S. Pat. No. 6,148,674, the disclosure of which is herein incorporated by reference in its entirety. Traditionally, these devices have had limited applicability at elevated temperatures. In particular, since the capacitance of prior art pressure sensors are normally in the picoFarad (pF) range, they are susceptible to stray capacitance and other environmental conditions. This makes it difficult to develop high temperature capacitive pressure sensors for use in harsh environment applications, such as, gas turbine applications. Indeed, there are currently no commercially available capacitive pressure sensors capable of operating above 350° C.

The stray capacitance obstacle has been overcome, in part, by a combination of guard techniques and frequency modulation (FM) capacitive transmitting technology. In order to achieve accurate and reliable gauging, all stray capacitance has to be excluded in the signal pick-off circuit. This can be prevented by a technique called guarding. Guarding is accomplished by surrounding the sensing electrode area with a non-sensing conductor that is kept at the same voltage as the sensing area itself. This technique is also used to guard a tri-axial cable connecting the pressure detector to a signal conditioning circuit. As a result, there is no loss of the input signal, even though the cable may be as long as up to 10 meters.

Another factor that influences capacitive pick-off signal is the resistance of the dielectric material, which decreases as the temperature increases. This makes the direct current (DC) signal difficult to detect at high temperatures. A frequency modulation (FM) capacitive measurement system resolves this problem. Use of FM makes the system sensitive to carrier frequency variations and ignores ESD (Electro Static Discharge) or EM (Electro Magnetic) varying fields.

Moreover, in high-temperature applications, many of the prior art capacitive pressure sensors utilize all metal diaphragms. However, one of the drawbacks of a metal diaphragm in a pressure sensor or microphone is temperature hysteresis and pressure hysteresis at high temperature. A useful capacitive pressure sensor having a diaphragm made of Inconel 750 has been manufactured and tested by the present inventors. A temperature cycle test from −55° C. to 500° C. at pressure from 15 psi to 600 psi shows that the temperature hysteresis in such a device is approximately 0.76% and the pressure hysteresis is approximately 1.3% without any thermal compensation. These values are relatively large compared to a silicon diaphragm, which is usually less than 0.25%.

Still further, in high temperature applications, packaging design is critical and a robust and reliable electrical connection between the sensor chip and base (header substrate) is essential. Usually, sensor failure at high temperature is due to the degrading of the electrical connection between the contacts and the output leads. An attempt to resolve this issue is described in U.S. Pat. No. 5,955,771 to D. Kurtz et al. D. Kurtz et al. describe a leadless electrical connection technique which is applied to a piezoresistive silicon chip that is hermetically bonded and sealed to a mounting surface of a Pyrex glass wafer using conductive glass frit. As shown in FIG. 1. of the Kurtz patent, the silicon chip is electrostatically bonded to a glass wafer. The glass wafer has several through holes which expose a portion of the contacts in the silicon wafer. The device stack is then mounted on a header substrate (also made of glass) having a few pins built in. The portion of each pin extending above the mounting surface is extended into contact apertures and making electrical connection between pins and contacts by conductive glass frit. The glass frit not only establishes the electrical connection but also provides a hermetic seal for the apertures.

The Kurtz et al. approach is based on glass-Si-glass stack. In general, the maximum safe working temperature for most Pyrex glass is taken to be the strain point (515° C.). Pyrex glass usually starts to deform if maintained at temperatures around 600° C. Some special Pyrex may hold up to 700° C. It is also found that plastic deformation takes place at 600~700° C. in silicon. Second, the thermal mismatch between Pyrex and silicon degrades the sensor accuracy at high temperature range. Third, the above design is based on piezoresistive approach. It is known that piezoresistive pressure sensors are temperature sensitive which requires complicated temperature compensation.

In contrast, capacitive pressure sensors do not need a semiconductor material to be used as sensing element. Many other high temperature materials can be selected as sensing elements. Since capacitive pressure sensors can utilize a material that is less sensitive to temperature, they are more accurate than piezoresistive sensor. By a combination of a so-called 'guard' technique with capacitive interface circuit, capacitive pressure sensor can provide reliable and accurate pressure sensing at extremely high temperature environment.

There is a need therefore, for a capacitive pressure sensor which is capable of operating in a high temperature environment, uses a diaphragm material which is not susceptible to hysteresis effects and has a packaging design that includes a robust and reliable electrical connection between sensor chip and base.

SUMMARY OF THE INVENTION

The subject invention is directed to new and useful capacitive pressure sensors for high temperature applications, such as for use in a gas turbine engine. Certain constructions of the capacitive probes or pressure sensors of the present invention include, inter alia, a housing that defines an interior sensing chamber and a pressure port which extends from an exterior of the housing to the interior sensing chamber. A sapphire diaphragm is disposed within the interior sensing chamber of the housing and has a first electrode formed on a central portion thereof. The central portion of the diaphragm and the first electrode are adapted and configured to deflect in response to pressure variations encountered within the interior sensing chamber and by the pressure sensor.

A sapphire substrate is disposed within the interior sensing chamber of the housing. The periphery of the sapphire substrate is fused to the sapphire diaphragm to form a sapphire stack and a reference chamber is defined between the central portion of the sapphire diaphragm and a central portion of sapphire substrate. The sapphire substrate has a second electrode formed on its central portion opposite the first electrode.

Prior to fusing the sapphire diaphragm to the sapphire substrate, all contact surfaces are chemically treated (e.g. RCA cleaned) and prepared using plasma activation, so as to create a bonding layer and to reduce the temperature required for the fusion.

It is envisioned that the capacitive pressure sensor of the present invention further includes a sensing electrode which is in electrical communication with the second electrode.

Preferably, the capacitive pressure sensor includes a second substrate that is positioned between the sapphire stack and the sensing electrode and is made from Alumina or High Temperature Co-fired Ceramic (HTCC). It is presently envisioned that the outer periphery of the sapphire stack and the second substrate are joined by brazing so as to hermetically seal the reference chamber. Alternatively, the outer periphery of the sapphire stack and the second substrate are joined using a glass-ceramic hermetic adhesive so as to hermetically seal the reference chamber.

In certain constructions of the present invention, a protuberance is formed on the central portion of the sapphire diaphragm. Alternatively, the protuberance can be formed on the central portion of the sapphire substrate. In either construction, the protuberance extends into the reference chamber and prevents the first electrode from contacting the second electrode upon deflection of the central portion of the sapphire diaphragm.

Preferably, the first and/or second electrodes are formed using a metal stack deposition process. In an embodiment of the present invention the first and/or second electrodes are made using platinum.

It is envisioned that a high temperature metal stack can be sputtered onto the bottom side of the sapphire substrate to seal off the reference chamber. As will be discussed herein below, the metal stack also provides for electrical communication between the sensing electrodes located in the reference chamber and pins/electrodes which extend through the HTCC/Alumina substrate.

It is further envisioned that the capacitive pressure sensor of the present invention can also include at least one pin that extends through the second substrate and provides electrical communication between the sensing electrode and the second electrode. Still further the sensor can also be provided with at least one pin that extends through the second substrate and is in electrical communication with the first electrode and ground.

In certain constructions of the present invention, the capacitive pressure sensor can include a thermocouple that extends from the exterior of the housing into the reference chamber for measuring the temperature within the pressure sensor.

The present invention is also directed to a capacitive pressure sensor that includes, among other elements, a sensor housing, a sensor header, a first electrode, and a second electrode. The sensor housing defines a pressure port which extends from an exterior of the housing to an interior sensing chamber. The sensor header is disposed within the interior sensing chamber of the housing and includes a sapphire stack attached to an alumina substrate. The sapphire stack formed in part by a sapphire diaphragm fused to a sapphire substrate so as to form a reference chamber therebetween. The first electrode is deposited on the sapphire diaphragm and extends through the sapphire substrate and alumina substrate to ground. The second electrode is deposited on the sapphire substrate and extending though the sapphire substrate and alumina substrate to a sensing electrode.

Deflection of a portion of the sapphire diaphragm in response to an applied pressure in the sensing chamber corresponds to a change in capacitance value detected by the sensing electrode.

It is presently envisioned that the outer periphery of the sapphire stack and the second substrate are joined by brazing so as to hermetically seal the reference chamber. Alternatively, the outer periphery of the sapphire stack and the second substrate are joined using a glass-ceramic hermetic adhesive so as to hermetically seal the reference chamber.

In certain constructions of the present invention, a protuberance is formed on the central portion of the sapphire diaphragm. Alternatively, the protuberance can be formed on the central portion of the sapphire substrate. In either construction, the protuberance extends into the reference chamber and prevents the first electrode from contacting the second electrode upon deflection of the central portion of the sapphire diaphragm.

Preferably, the first and/or second electrodes are formed using a metal stack deposition process. In an embodiment of the present invention the first and/or second electrodes are made using platinum.

It is envisioned that a high temperature metal stack can be sputtered onto the bottom side of the sapphire substrate to seal off the reference chamber.

It is further envisioned that the capacitive pressure sensor of the present invention can also include at least one pin that extends through the second substrate and provides electrical communication between the sensing electrode and the second electrode. Still further the sensor can also be provided with at least one pin that extends through the second substrate and is in electrical communication with the first electrode and ground.

In certain constructions of the present invention, the capacitive pressure sensor can include a thermocouple that extends from the exterior of the housing into the reference chamber for measuring the temperature within the pressure sensor.

In certain constructions of the present invention, the sensing electrode is shielded from signal line parasitic capacitance to ground. Preferably, the sensing electrode is shielded from signal line parasitic capacitance to ground by a guard ring. Still further it is envisioned that the guard ring is driven by a voltage potential equal to a voltage potential running through the signal line. Still further, a ceramic insulator is disposed between the sensing electrode and guard ring.

The present invention is also directed to a sensing element for use in a capacitive pressure sensor that includes, inter alia, a sapphire diaphragm and a sapphire substrate. The sapphire diaphragm has a first platinum electrode formed on a central portion thereof using a metal deposition process. The central portion of the diaphragm and the first electrode are adapted and configured to deflect in response to pressure variations encountered the capacitive pressure sensor. The sapphire substrate is fused to the sapphire diaphragm about its periphery to form a sapphire stack and a reference chamber is created between the central portion of the sapphire diaphragm and a central portion of sapphire substrate. The sapphire substrate has a second platinum electrode formed on its central portion using a metal deposition process. The first and second platinum electrodes are arranged to seal off the reference chamber when the sapphire diaphragm is fused to the sapphire substrate.

Preferably, prior to fusing the sapphire diaphragm to the sapphire substrate, all contact surfaces are chemically treated (e.g. RCA cleaned) and prepared using plasma activation, so as to create a bonding layer and to reduce the temperature required for the fusion.

The present invention is further directed to a method for making a sensing element for use in a capacitive pressure sensor that includes the steps of: providing a sapphire diaphragm element having an upper and lower surface; and forming a first electrode on a central portion of the lower surface of the sapphire diaphragm element using a metal deposition process. The central portion of the diaphragm element and the first electrode are adapted and configured to deflect in response to pressure variations encountered by the capacitive pressure sensor. The inventive method further includes the steps of: providing a sapphire substrate having an upper and lower surface; forming a second electrode on a central portion of the upper surface of the sapphire substrate using a metal deposition process; chemically treating (e.g. RCA cleaning) and preparing the outer periphery of each of the sapphire diaphragm element and the sapphire substrate using plasma activation; and fusing the sapphire diaphragm about its periphery to the sapphire substrate to form a sapphire stack and create a reference chamber between the central portion of the sapphire diaphragm and a central portion of sapphire substrate.

These and other features and benefits of the subject invention and the manner in which it is assembled and employed will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the capacitive pressure sensors of the subject invention without undue experimentation, preferred embodiments thereof will be described in detail hereinbelow with reference to certain figures, wherein:

FIG. 2b is a cross-sectional view of the sapphire diaphragm of FIG. 2a;

FIG. 3b is a cross-sectional view of the sapphire substrate of FIG. 3a;

These and other aspects of the subject invention will become more readily apparent to those having ordinary skill in the art from the following detailed description of the invention taken in conjunction with the drawings.

DETAILED DESCRIPTION OF PREFERRED EMBODIMENTS

Figure 1:
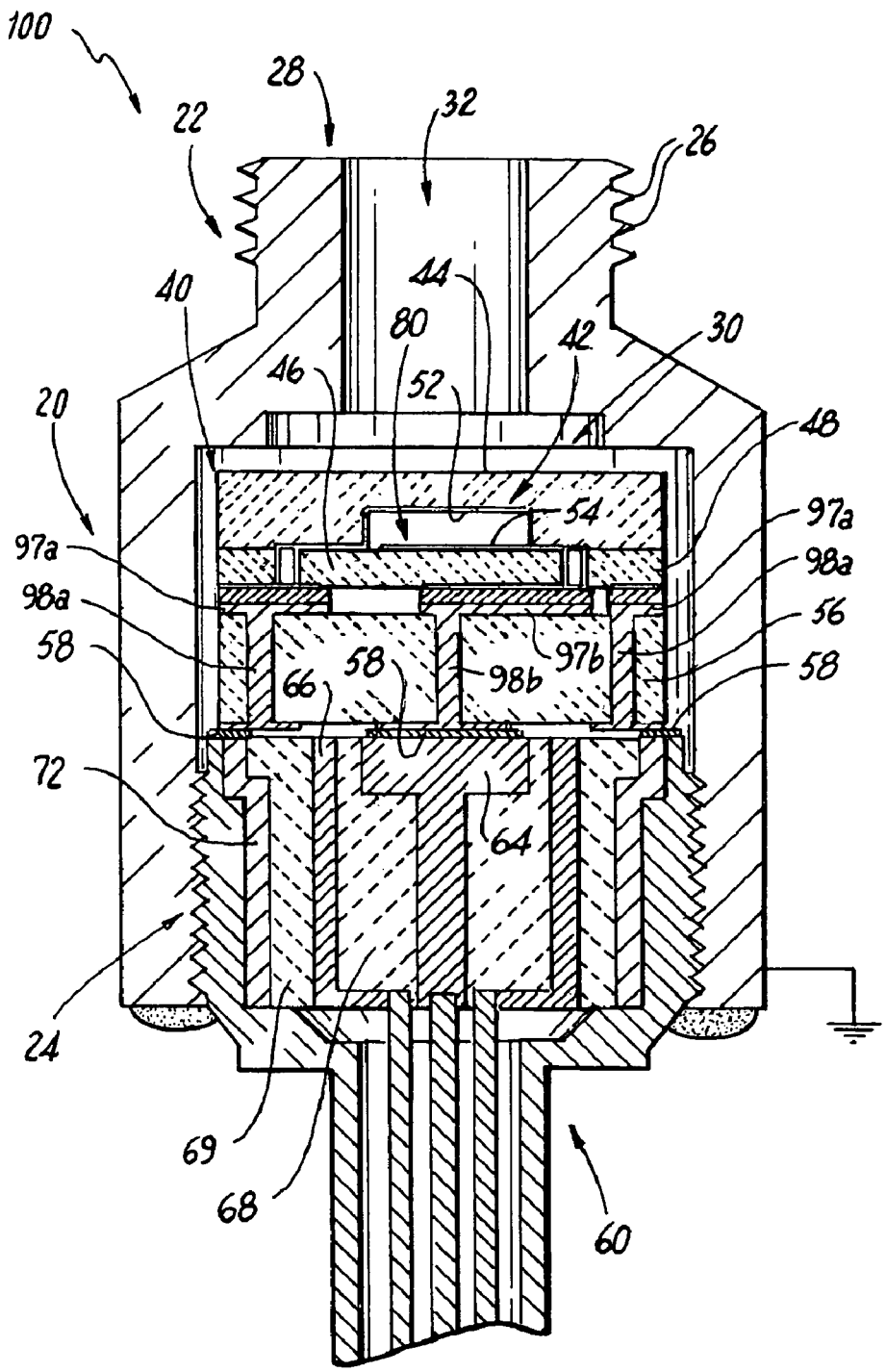
FIG. 1 is a cross-sectional view of a capacitive pressure sensor which has been constructed in accordance with a preferred embodiment of the subject invention.

Referring now to the drawings wherein similar reference numerals identify similar structural features or aspects of the capacitive sensors of the subject invention, there is illustrated in FIG. 1, a capacitive probe or pressure sensor constructed in accordance with a preferred embodiment of the subject invention and designated generally by reference numeral 100. Pressure sensor 100 is adapted and configured for high temperature applications, such as for use in a gas turbine engine.

Referring to FIGS. 1 through 7, pressure sensor 100 includes a housing assembly 20 having a mounting section 22 and electrode support section 24. The electrode support section 24 is adapted and configured for receiving an electrode assembly 60 which will be discussed hereinbelow.

The mounting section 22 of the housing assembly 20 includes a series of threads 26 associated with end 28. The threads 26 can be used to connect the sensor 100 to the pressure source to be measured. For example, the threads 26 can be used to connect the sensor 100 to the housing of a combustor. Those skilled in the art will readily appreciate that other mechanisms for connecting the sensor to the pressure source can be employed without departing from the scope of the present invention.

Housing 20 defines an interior sensing chamber 30 and a pressure port 32 that extends from an exterior of the housing 20 to the interior sensing chamber 30. A sensing assembly 40 is disposed within the interior sensing chamber of the housing 20. The sensing assembly 40 includes a sapphire diaphragm 42 that has a first electrode 52 formed on a central portion 44 thereof. The central portion 44 of the diaphragm 42 and the first electrode 52 are adapted and configured to deflect in response to pressure variations encountered within interior sensing chamber 30 and by the pressure sensor 100.

A sapphire substrate 46 is disposed within the interior sensing chamber 30 of the housing 20. The periphery 48 of the sapphire substrate 46 is fused to the sapphire diaphragm 42 to form a sapphire stack 50 (see FIG. 4). A reference chamber 80 is defined between the central portion 44 of the sapphire diaphragm 42 and a central portion 49 of sapphire substrate 46.

The sapphire substrate 46 has a second electrode 54 formed on its central portion 49 opposite the first electrode 52. Prior to fusing the sapphire diaphragm 42 to the sapphire substrate 46, all contact surfaces are chemically treated (e.g. RCA cleaned) and prepared using plasma activation, so as to create a bonding layer. This process also reduces the temperature required for fusion of the sapphire elements to below the melting point of the conductive material used for the first and second electrodes 52/54.

As best seen in FIG. 3, a gap "G" is provided within the reference chamber 80 between the first electrode 52 and the second electrode 54. In the embodiment disclosed in this figure, the gap "G" is between about 5 µm and 70 µm. The gap distance corresponds to a certain range of capacitance values, for example, 0.5 pF to 20 pF.

Electrode assembly 60 has a series of threads 62 formed on its outer periphery which are adapted and configured for mating with a corresponding series of threads formed on an inner diameter of the electrode support section 24 of housing 20. Once the electrode assembly 60 is threaded into the electrode support section 24, the two parts can be welded together as shown in order to improve the sealing of reference chamber 80.

Electrode assembly 60 includes a sensing electrode 64 which is shielded from signal line parasitic capacitance to ground. In particular, the sensing electrode 64 is shielded from signal line parasitic capacitance to ground by a guard ring 66. Preferably, the guard ring 66 is driven by a voltage potential equal to a voltage potential running through the signal line. For example, an inverter buffer circuit can be used. Furthermore, a ceramic insulator 68 is disposed between the sensing electrode 64 and guard ring 66. Another ceramic insulator 69 surrounds the guard ring 66 and a stainless steel shield 72 surrounds insulator 69.

With sensor 100 a relatively small capacitance variation can be precisely measured and transmitted to a remote readout electronic circuit through, for example, a 3 meter long tri-axial cable. As mentioned above, to eliminate signal line parasitic capacitance to ground, guard ring 66 is driven by the same voltage potential as that which is running through the signal line. Therefore, there is no AC current between the signal line and the guard ring 66, and any capacitance between the two does not affect the charge transfer through the signal line. This means that the capacitance between the guard ring 66 and the signal line does not have any contribution to the output.

The sensing assembly used in capacitive pressure sensor 100 also includes a second substrate 56 that is positioned between the sapphire stack 50 and the sensing electrode 64. Preferably, the second substrate is made from Alumina or High Temperature Co-fired Ceramic (HTCC) and will be referred to herein as HTCC/Alumina substrate 56. As will be discussed herein below, the outer periphery of the sapphire stack 50 and the second substrate 56 are joined by brazing 58, so as to provide a second hermetic seal for the reference chamber 80. As discussed above, the first hermetic seal was formed by sputtering metal onto the bottom of the sapphire substrate.

Figure 5:
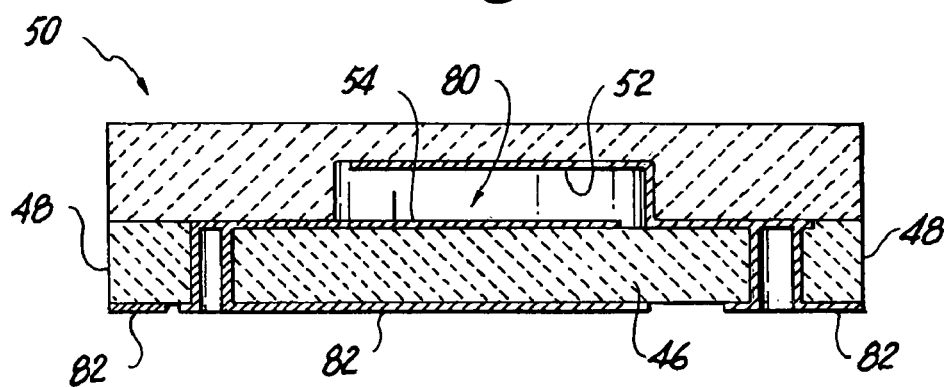
FIG. 5 is a cross-sectional view which illustrates the high temperature metal stack which is sputtered onto the bottom of the sapphire stack of FIG. 4.
Figure 6:
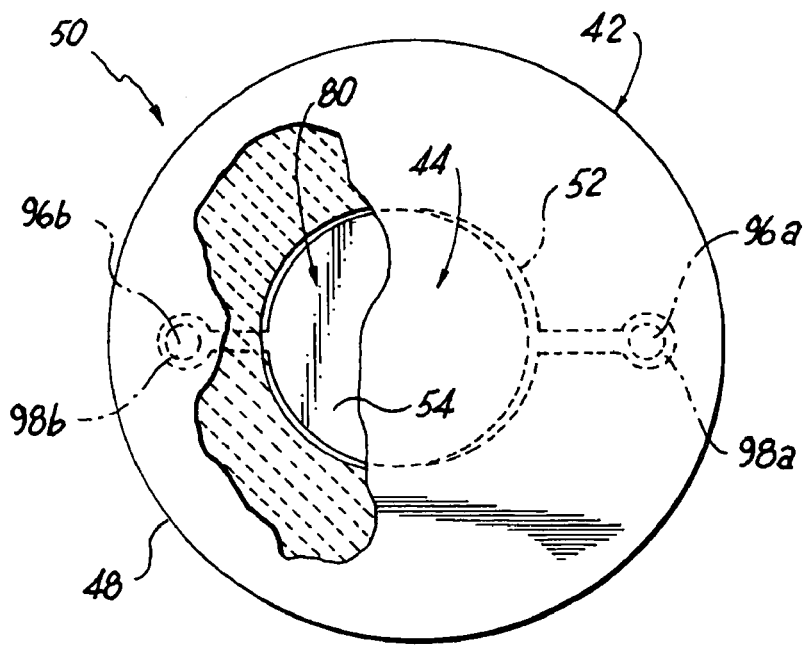
FIG. 6 is a plan view illustrating the area in which the first and second electrodes are deposited onto the sapphire diaphragm and sapphire substrate respectively.

The first and second electrodes 52/54 are formed using a metal stack deposition process and can be made using metal such as, for example, platinum or titanium. Additionally, as best shown in FIG. 5, a high temperature metal stack 82 is sputtered or deposited onto the bottom side of the sapphire substrate 46 to seal off the reference chamber 80.

Figure 2A:
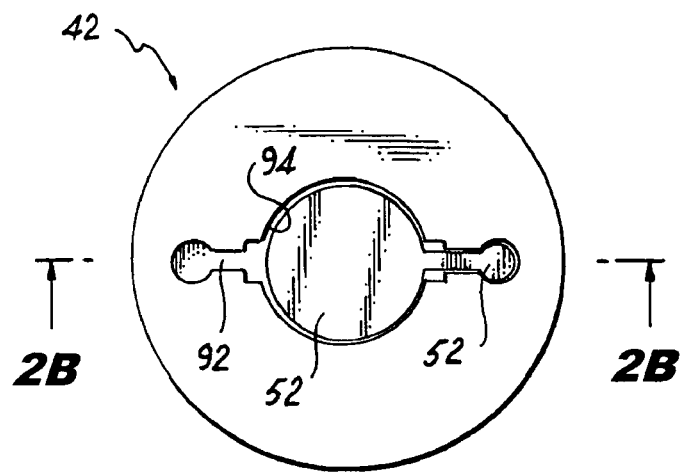
FIG. 2a is a bottom plan view of a sapphire diaphragm used in the capacitive pressure sensor of FIG. 1.
Figure 2B:
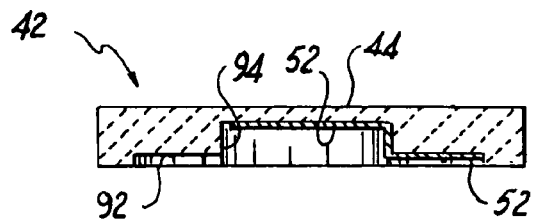

FIGS. 2A through 7 illustrate a representative method for fabricating pressure sensor 100 and more particularly, sensing assembly 40. Referring now to FIGS. 2A and 2B, which illustrate bottom and cross-sectional views of sapphire diaphragm 42. As shown in FIG. 2B, a shallow cavity 92 and a deep cavity 94 are provided on the bottom of the sapphire diaphragm 42. The cavities 92/94 can be formed using a variety of known techniques. However, the inventor of the present application has determined that a preferably, shallow cavity 92 can be formed using a reactive ion etching process and deep cavity 94 can be formed using an abrasive etching process, such as that described in http://www.ikonicsindustrial.com.index.html.

In a representative construction the thickness of sapphire diaphragm 42 or wafer can be about 250 microns and 1 micron shallow cavity 92 can be etched in the bottom. Then, the deep cavity 94 can be formed by an abrasive etch and can be about 50 microns deep (up to 70 microns) and about 2 mm in diameter.

Next, a metal stack of, for example, Ta 500 A or Pt 3000 A, can be deposited on the floor of deep cavity 94, along a portion of the peripheral edge of the deep cavity and radially outward into the shallow cavity 92, so as to form the first electrode 52.

It should be noted that the 1 micron shallow cavity 92 is made in sapphire diaphragm 42 as a recess for portions of the first and second electrodes, so as to avoid damage to the electrodes when fusing the sapphire substrate 46 to the sapphire diaphragm 42. Since the shallow cavity is about 1 micron deep and the metal stack thickness is about 3 microns, the reference chamber can be sealed off in a sputter machine at high vacuum, as shown in FIG. 5. Those skilled in the art will readily appreciate that the shallow cavity 92 can be etched in sapphire substrate 46 instead of the sapphire diaphragm 42.

An alternative approach for forming the deep cavity 94 is to form a cavity by fusion bonding a flat plate to a 50 micron ring. In this case, two fusion bond steps are required to form a sapphire stack 50.

Figure 3A:
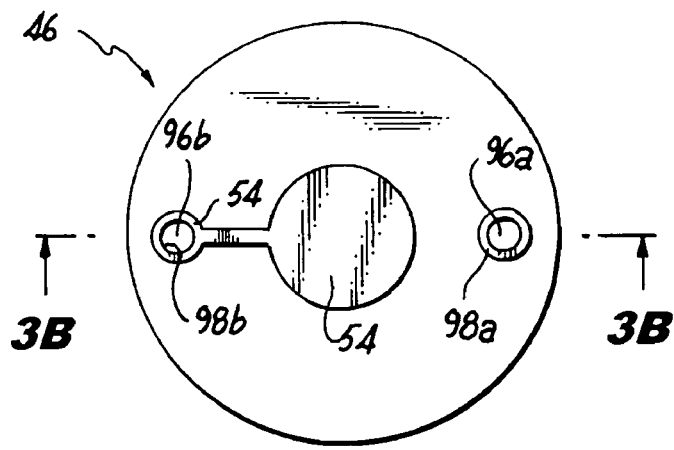
FIG. 3a is a top plan view of a sapphire substrate used in the capacitive pressure sensor of FIG. 1.
Figure 3B:
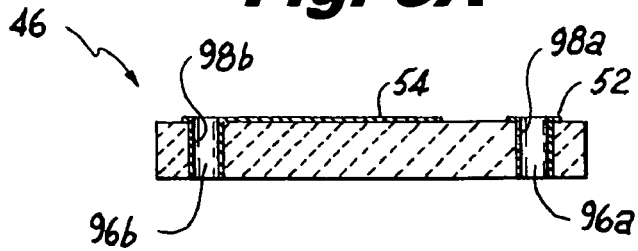

FIGS. 3A and 3B illustrate a representative construction for sapphire substrate 46. The thickness of the substrate can be for example, between about 500 microns and about 800 microns. Two through holes 96a/96b are formed in the substrate 46 by ultra-sonic etch or abrasive etch. A high temperature metal stack (e.g., Ta 500 A/Pt 3000 A) is deposited in two parts as shown in FIG. 3B. The first part 98a provides a path for electricity to communicate from the first electrode 52 formed on the sapphire diaphragm 42 through the sapphire substrate 46. The second part 98b forms the second electrode and also provides a conductive path through the sapphire substrate 46. The platinum sputtering hermetically seals in a vacuum the reference chamber. The use of the metal sputtering in a sapphire to sapphire direct bond structure, not only withstands extremely high temperature, but also eliminates hysterisis effect of bond interface.

Figure 4:
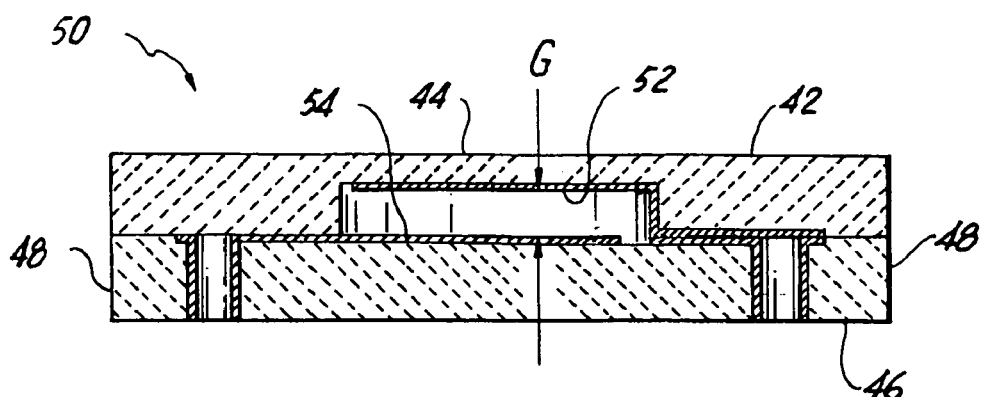
FIG. 4 is a cross-sectional view of a sapphire stack which has been formed using the sapphire diaphragm of FIGS. 2a-2b and the sapphire substrate of FIGS. 3a-3b.

As noted above, after chemical treating and plasma activation, the sapphire diaphragm 42 and sapphire substrate 46 are directly fused together about the periphery. The fusion process can be followed by a 1050° C. annealing in vacuum to form the sapphire stack 50, as shown in FIG. 4. Then, a high temperature metal stack 82 is sputtered on the bottom side of the sapphire substrate to further seal the reference chamber 80 in a vacuum, as shown in FIG. 5.

Figure 7:
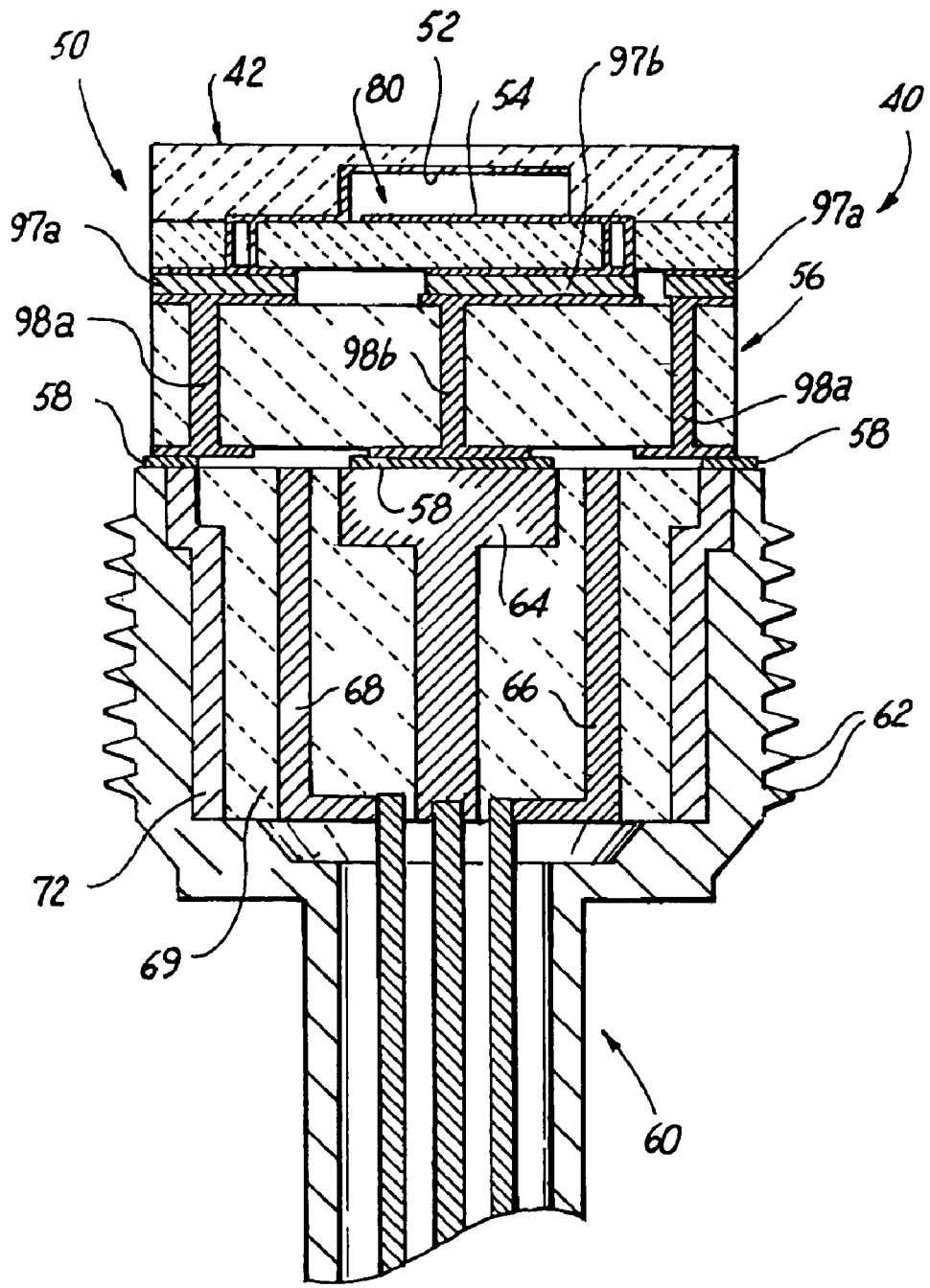
FIG. 7 is a cross-sectional view of the sapphire stack of FIG. 4 mounted onto a alumina of HTTC substrate and secured to a tri-axial mineral insulated cable assembly.

Referring now to FIG. 7 which depicts the sapphire stack 50 mounted onto the HTCC/Alumina substrate 56 so as to form the completed sensing assembly 40. The sapphire stack 50 is joined to HTCC substrate 56 by brazing at around 1000° C. The brazing material is identified in FIG. 7 as reference numerals 97a and 97b. The brazing material 97a, which is located around the periphery of the stack/substrate joint, allows electricity to communicate from the first electrode 52 to platinum conductor 98a that is formed on the top, bottom and within substrate 56. The brazing material 97a also aids in sealing the reference chamber. The brazing material 97b located in the center of the stack/substrate joint, allows electricity to conduct between the second electrode 54 and a centrally positioned platinum conductor formed on the top, bottom and within the HTCC/Alumina substrate 56.

Since the thermal expansion coefficient of the HTCC or Alumina material used in the second substrate 56 is between that of sapphire and Inconel, the HTCC substrate can act as a transition joint material between the metal sensing electrode 64 and the sapphire stack 50.

As shown in FIG. 7, after completion of the sensing assembly 40 it is joined to tri-axial metal probe or electrode assembly 60 by brazing at approximately 980° C.

Housing assembly 20 can be made from Inconel or Haynes 230, for example, and is finally welded to the electrode assembly to complete sensor 100 which is capable of withstanding temperatures up to 1000° C.

Figure 8:
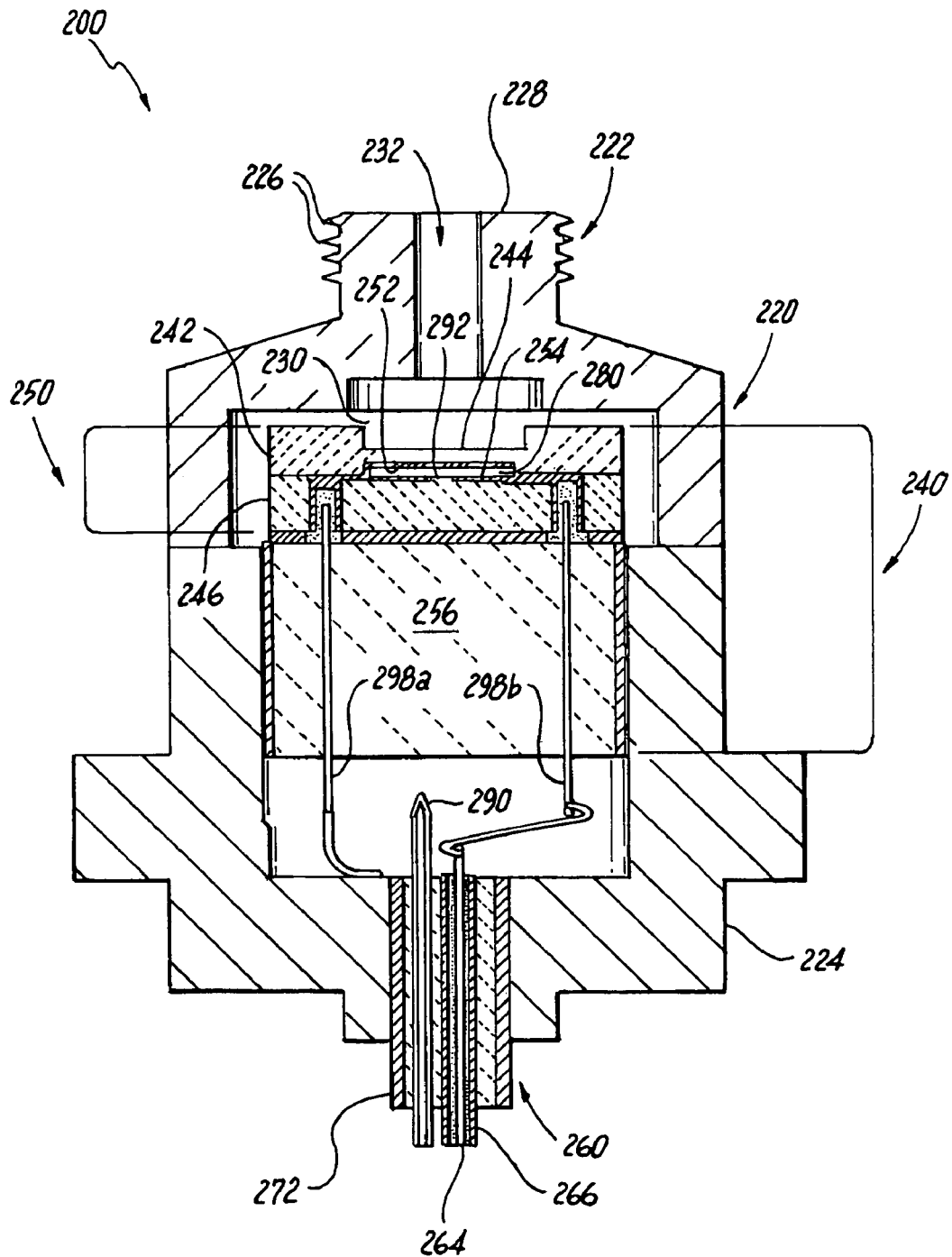
FIG. 8 is a cross-sectional view of a second embodiment of the capacitive pressure sensor of the present invention.
Figure 9:
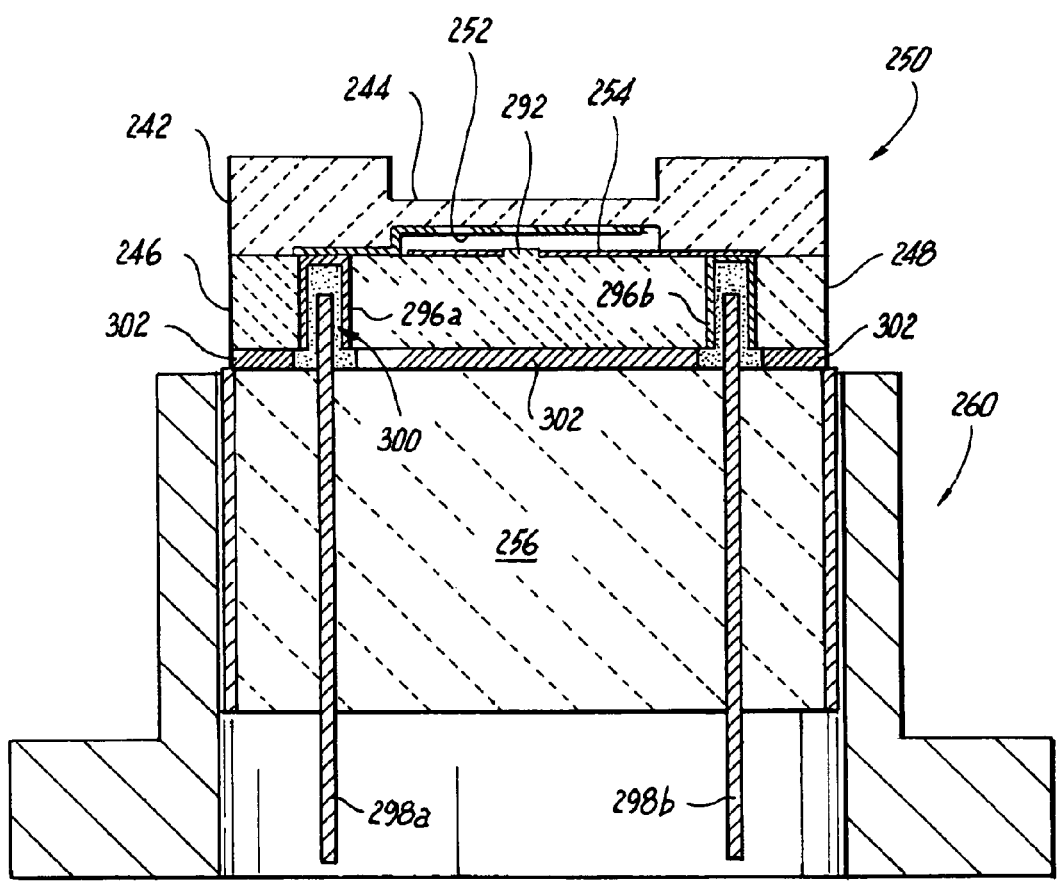
FIG. 9 is a cross-section view of a sensor header used in the pressure sensor shown in FIG. 8.

Referring now to FIGS. 8 and 9 which illustrate a capacitive pressure sensor which has been constructed in accordance with a second embodiment of the present invention and has been designated as reference number 200.

Like pressure sensor 100, pressure sensor 200 includes a housing assembly 220 having a mounting section 222 and electrode support section 224. The electrode support section 224 is adapted and configured for receiving electrode assembly 260.

The mounting section 222 of the housing assembly 220 includes a series of threads 226 associated with end 228. The threads 226 can be used to connect the sensor 200 to the pressure source to be measured. For example, the threads 226 can be used to connect that sensor 200 to the housing of a combustor. Those skilled in the art will readily appreciate that other mechanisms for connecting the sensor to the pressure source can be employed without departing from the scope of the present invention.

Housing 220 defines an interior sensing chamber 230 and a pressure port 232 that extends from an exterior of the housing 220 to the interior sensing chamber 230. A sensing assembly 240 is disposed within the interior sensing chamber of the housing 220. The sensing assembly 240 includes a sapphire diaphragm 242 that has a first electrode 252 formed on a central portion 244 thereof. The central portion 244 of the diaphragm 242 and the first electrode 252 are adapted and configured to deflect in response to pressure variations encountered within interior sensing chamber 230 and by the pressure sensor 200.

A sapphire substrate 246 is disposed within the interior sensing chamber 230 of the housing 220. The periphery 248 of the sapphire substrate 246 is fused to the sapphire diaphragm 242 to form a sapphire stack 250. A reference chamber 280 is defined between the central portion 244 of the sapphire diaphragm 242 and a central portion 244 of sapphire substrate 246.

The sapphire substrate 246 has a second ring-shaped electrode 254 formed on its upper surface, opposite the first electrode 252. Prior to fusing the sapphire diaphragm 242 to the sapphire substrate 246, all contact surfaces are chemically treated (e.g. RCA cleaned) and prepared using plasma activation, so as to create a bonding layer. As noted previously, this process reduces the temperature required for fusion of the sapphire elements to below the melting point of the conductive material used for the first and second electrodes.

Like the previously described embodiment, electrode assembly 260 can be secured to the housing 220 using corresponding threads and/or by welding or by using any other known technique.

Electrode assembly 260 includes a sensing electrode 264 which is shielded from signal line parasitic capacitance to ground. Similar to the previously described embodiment, the sensing electrode 264 is shielded from signal line parasitic capacitance to ground by a guard ring 266 which is driven by a voltage potential equal to a voltage potential running through the signal line. Furthermore, a ceramic insulator is disposed between the sensing electrode 264 and guard ring 266. Another ceramic insulator surrounds the guard ring 266 and a stainless steel shield 272 surrounds the insulator.

The sensing assembly used in capacitive pressure sensor 200 also includes a second substrate 256 that is positioned beneath the sapphire stack 250. Preferably, the second substrate is made from Alumina or High Temperature Co-fired Ceramic (HTCC) and will be referred to herein as HTCC/Alumina substrate 256.

In the previously described embodiment, the sapphire stack 50 and the second substrate 56 were joined by brazing so as to hermetically seal the reference chamber. In the embodiment shown in FIGS. 8 and 9, the outer periphery of the sapphire stack 250 and the second substrate 256 are joined using a non-conductive glass-ceramic hermetic adhesive so as to hermetically seal the reference chamber.

A sapphire-sapphire-alumina/HTCC sensing assembly, such as sensing assembly 240, can handle higher firing temperatures than traditional glass-SiC-glass constructions. As a result, a bonding adhesive can be used between the sapphire stack 250 and the header or second substrate 256 and the adhesive can advantageously have a relatively higher operating temperature than glass frit.

A high temperature glass-ceramic sealer which can operate up to or above 800° C. can be used for the hermetic seal between sapphire stack and the second substrate. In FIG. 9, the sealer is identified as reference numeral 302. The use of a glass-ceramic adhesive to join the sapphire stack to the substrate also the sensor to withstand higher temperature than if glass frit was used for this joint.

Unlike sensor 100, pressure sensor 200 includes at least two pins 298a/298b that extend through the second substrate 256 into apertures 296a/296b formed in the sapphire substrate 246. It should be noted, like before conductive metal is deposited on the wall of the apertures 296a/296b. Moreover, the pins can be made from a high temperature metal, such as, platinum, inconel, stainless steel, etc.

A conductive glass-ceramic adhesive 300 which can operate up to or above 800° C. can be used to fill the apertures 296a/296b and make electrical connection between the pins 298a/298b embedded within the second substrate 256 and the first and second electrodes 252/254 associated with the sapphire stack 250. Like before, the first and second electrodes 252/254 can be formed using a metal stack deposition process and can be made using metal such as, for example, platinum or titanium. The non-conductive glass/ceramic adhesive 302 (joint between the sapphire stack and the HTCC/alumina substrate) and the conductive glass/ceramic adhesive 300 are fired at the same temperature profile so that the electrical connection (pin-to-pin electrical isolation) and the hermetic seal are formed at the same time.

As a result, the first pin 298b provides electrical communication between the sensing electrode 264 and the second electrode 254 and the second pin 298a provides electrical communication with the first electrode 252 and ground. Those skilled in the art will readily appreciate that more than two pins can be used without departing from the scope of the present invention.

As shown in FIG. 8, the capacitive pressure sensor 200 can also include a thermocouple 290 that extends from the exterior of the housing 220 into the sensing chamber 230 and/or reference chamber 280 for measuring the temperature within pressure sensor 200.

A protuberance 292 is formed on the central portion of the sapphire substrate 246. Alternatively, the protuberance 292 could be formed on the central portion 244 of the sapphire diaphragm 242. In either construction, the protuberance extends 292 into the reference chamber 280 and prevents the first electrode 252 from contacting the second electrode 254 upon deflection of the central portion 244 of the sapphire diaphragm 242.

Those skilled in the art will readily appreciate that deflection of a portion of the sapphire diaphragm 242 in response to an applied pressure in the sensing chamber 230 corresponds to a change in capacitance value detected by the sensing electrode 264.

Sapphire is a single crystal $Al_2O_3$, which has stable mechanical property at high temperature range. Because of a strong chemical bond strength between the Al and O ion, Sapphire (and Alumina) has outstanding physical stability, such as high melting point, the highest hardness among oxides and a high mechanical strength at room temperature. Sapphire (and Alumina) is also chemically very stable and has a high corrosion resistance. Yield strength of Sapphire is much higher than that of material, such as Haynes 230.

Moreover, the ultimate strength of Sapphire is 1.9 GPa, while Haynes 230 is 860 MPa. Plastic deformation (creep) will occur above 900° C. in sapphire. The resolved creep yield stress is about 11094 PSI at 900° C., and 1850 PSI at 1400° C. Such excellent mechanical properties makes sapphire a good candidate to replace silicon as the high temperature pressure sensor diaphragm material. Sapphire is also a good insulating material at high temperature. The electrical resistivity of sapphire is between $5 \times 10^{18}$ ohm-cm at room temperature and $5 \times 10^6$ ohm-cm at 1000° C.

Therefore, sapphire can also replace Pyrex which is used in many constructions. Additionally, sapphire has a relatively high thermal expansion coefficient as compared to other single crystal high temperature ceramics, such as AlN, which makes it easier for sapphire to be joined with a metal than AlN.

Those skilled in the art will readily appreciate that a sapphire-sapphire-alumina sensing header or sensing assembly, can operate at higher temperatures than a glass-Si-glass structure or a glass-SiC-glass structure. Moreover, use of s sapphire diaphragm as the sensing element provides a less temperature sensitive capacitive pressure sensor than piezoresistive pressure sensor.

While the subject invention has been described with respect to preferred embodiments, those skilled in the art will readily appreciate that changes and modifications may be made thereto without departing from the spirit and scope of the subject invention as defined by the appended claims.

What is claimed is:

1. A capacitive pressure sensor comprising:
   i) a housing defining an interior sensing chamber and a pressure port which extends from an exterior of the housing to the interior sensing chamber;
   ii) a sapphire diaphragm disposed within the interior sensing chamber of the housing and having a first electrode formed on a central portion thereof, the central portion of the diaphragm and the first electrode being adapted and configured to deflect in response to pressure variations encountered within interior sensing chamber; and
   iii) a sapphire substrate disposed within the interior sensing chamber of the housing, wherein a peripheral portion of the sapphire substrate is fused to the sapphire diaphragm to form a sapphire stack and a reference chamber is defined between the central portion of the sapphire diaphragm and a central portion of sapphire substrate, the sapphire substrate having a second electrode formed on its central portion opposite the first electrode, wherein prior to fusing the sapphire diaphragm to the sapphire substrate, all contact surfaces are chemically treated and prepared using plasma activation, so as to create a bonding layer and to reduce the temperature required for the fusion.

2. A capacitive pressure sensor as recited in claim 1, further comprising a sensing electrode which is in electrical communication with the second electrode.

3. A capacitive pressure sensor as recited in claim 2, further comprising a second substrate positioned between the sapphire stack and the sensing electrode and made from Alumina or High Temperature Co-fired Ceramic (HTCC).

4. A capacitive pressure sensor as recited in claim 3, wherein the outer periphery of the sapphire stack and the second substrate are joined by brazing so as to hermetically seal the reference chamber.

5. A capacitive pressure sensor as recited in claim 3, wherein the outer periphery of the sapphire stack and the second substrate are joined using a non-conductive glass-ceramic hermetic adhesive so as to hermetically seal the reference chamber.

6. A capacitive pressure sensor as recited in claim 1, wherein a protuberance is formed on the central portion of the sapphire diaphragm or the sapphire substrate which extends into the reference chamber and prevents the first electrode from contacting the second electrode upon deflection of the central portion of the sapphire diaphragm.

7. A capacitive pressure sensor as recited in claim 1, wherein the first and/or second electrodes are formed using a metal stack deposition process.

8. A capacitive pressure sensor as recited in claim 1, wherein the first and/or second electrodes are made using platinum.

9. A capacitive pressure sensor as recited in claim 1, wherein a high temperature metal stack is sputtered on a bottom side of the sapphire substrate to seal off the reference chamber.

10. A capacitive pressure sensor as recited in claim 3, further comprising:
    i) at least one pin extending through the second substrate which provides electrical communication between the sensing electrode and the second electrode; and
    ii) at least one pin extending through the second substrate which is in electrical communication with the first electrode and ground.

11. A capacitive pressure sensor as recited in claim 1, further comprising a thermocouple extending from the exterior of the housing into the reference chamber for measuring the temperature within the pressure sensor.

12. A capacitive pressure sensor as recited in claim 1, wherein the central portion of the sapphire diaphragm is formed using an abrasive etching process.

13. A capacitive pressure sensor as recited in claim 1, wherein a portion of the first electrode is disposed in a cavity formed in the sapphire diaphragm by reactive ion etching.

14. A capacitive pressure sensor comprising:
    i) a sensor housing defining a pressure port which extends from an exterior of the housing to an interior sensing chamber;
    ii) a sensor header disposed within the interior sensing chamber of the housing which includes a sapphire stack attached to an alumina substrate; the sapphire stack including a sapphire diaphragm fused to a sapphire substrate so as to form a reference chamber therebetween;
    iii) a first electrode deposited on the sapphire diaphragm and extending through the sapphire substrate and alumina substrate to ground; and
    iv) a second electrode deposited on the sapphire substrate and extending though the sapphire substrate and alumina substrate to a sensing electrode; and
    wherein deflection of a portion of the sapphire diaphragm in response to an applied pressure in the sensing chamber corresponds to a change in capacitance value detected by the sensing electrode.

15. A capacitive pressure sensor as recited in claim 14, wherein the outer periphery of the sapphire stack and the second substrate are joined by brazing so as to hermetically seal the reference chamber.

16. A capacitive pressure sensor as recited in claim 14, wherein the outer periphery of the sapphire stack and the second substrate are attached using a non-conductive glass-ceramic hermetic adhesive so as to hermetically seal the reference chamber.

17. A capacitive pressure sensor as recited in claim 14, wherein a protuberance is formed on a central portion of the sapphire diaphragm or the sapphire substrate which extends into the reference chamber and prevents the first electrode from contacting the second electrode upon deflection of the central portion of the sapphire diaphragm.

18. A capacitive pressure sensor as recited in claim 14, wherein the first and/or second electrodes are formed using a metal stack deposition process.

19. A capacitive pressure sensor as recited in claim 14, wherein the first and/or second electrodes are made using platinum.

20. A capacitive pressure sensor as recited in claim 14, wherein a high temperature metal stack is sputtered on a bottom side of the sapphire substrate to seal off the reference chamber.

21. A capacitive pressure sensor as recited in claim 14, wherein the second electrode includes at least one pin that extends through the second substrate and provides electrical communication between the sensing electrode and the second electrode; and wherein the first electrode includes at least one pin that extends through the second substrate and provides electrical communication between the first electrode and ground.

22. A capacitive pressure sensor as recited in claim 14, further comprising a thermocouple extending from the exterior of the housing into the reference chamber for measuring the temperature within the pressure sensor.

23. A capacitive pressure sensor as recited in claim 14, wherein the sensing electrode is shielded from signal line parasitic capacitance to ground.

24. A capacitive pressure sensor as recited in claim 23, wherein the sensing electrode is shielded from signal line parasitic capacitance to ground by a guard ring.

25. A capacitive pressure sensor as recited in claim 24, wherein the guard ring is driven by a voltage potential equal to a voltage potential running through the signal line.

26. A capacitive pressure sensor as recited in claim 25, wherein a ceramic insulator is disposed between the sensing electrode and guard ring.

27. A sensing element for use in a capacitive pressure sensor comprising:
   i) a sapphire diaphragm having a first platinum electrode formed on a central portion thereof using a metal deposition process, the central portion of the diaphragm and the first electrode being adapted and configured to deflect in response to pressure variations encountered the capacitive pressure sensor; and
   ii) a sapphire substrate fused to the sapphire diaphragm about its periphery to form a sapphire stack and creating a reference chamber between the central portion of the sapphire diaphragm and a central portion of sapphire substrate, the sapphire substrate having a second platinum electrode formed on its central portion using a metal deposition process; and
   wherein the first and second platinum electrodes are arranged to seal off the reference chamber when the sapphire diaphragm is fused to the sapphire substrate.

28. A sensing element as recited in claim 27, wherein prior to fusing the sapphire diaphragm to the sapphire substrate, all contact surfaces are chemically treated and prepared using plasma activation, so as to create a bonding layer and to reduce the temperature required for the fusion.

29. A method for making a sensing element for use in a capacitive pressure sensor comprising:
   i) providing a sapphire diaphragm element having an upper and lower surface;
   ii) forming a first electrode on a central portion of the lower surface of the sapphire diaphragm element using a metal deposition process, the central portion of the diaphragm element and the first electrode being adapted and configured to deflect in response to pressure variations encountered by the capacitive pressure sensor;
   iii) providing a sapphire substrate having an upper and lower surface;
   iv) forming a second electrode on a central portion of the upper surface of the sapphire substrate using a metal deposition process;
   v) chemically treating and preparing the outer periphery of each of the sapphire diaphragm element and the sapphire substrate using plasma activation; and
   vi) fusing the sapphire diaphragm about its periphery to the sapphire substrate to form a sapphire stack and create a reference chamber between the central portion of the sapphire diaphragm and a central portion of sapphire substrate.

* * * * *